United States Patent
Kim et al.

(10) Patent No.: US 6,462,141 B1
(45) Date of Patent: Oct. 8, 2002

(54) DIENE COPOLYMER SUBSTITUTED BY ALKOXY SILANE, AND ORGANIC AND INORGANIC HYBRID COMPOSITION COMPRISING THE SAME

(75) Inventors: Eun-Kyoung Kim; Hyung-Suk Cho, both of Daejeon; Young-Pil Kim, Seongnam, all of (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 09/460,643

(22) Filed: Dec. 15, 1999

(30) Foreign Application Priority Data

Mar. 23, 1999 (KR) ............................................. 99-9872

(51) Int. Cl.$^7$ .................................................. C08F 8/00
(52) U.S. Cl. ................. 525/332.8; 524/572; 525/332.9; 525/333.1; 525/333.2; 525/342
(58) Field of Search ........................... 525/332.8, 332.9, 525/333.1, 333.2, 342; 524/572

(56) References Cited

U.S. PATENT DOCUMENTS

| | | | | |
|---|---|---|---|---|
| 3,445,278 A | * | 5/1969 | Stanton | 427/393.4 |
| 4,230,815 A | * | 10/1980 | Itoh et al. | 525/101 |
| 5,530,064 A | * | 6/1996 | Ashton et al. | 525/102 |
| 5,580,935 A | * | 12/1996 | Shaffer | 525/332.1 |

FOREIGN PATENT DOCUMENTS

| | | |
|---|---|---|
| EP | 0 786 493 A1 | 7/1997 |
| JP | 9-208632 | 8/1997 |
| JP | 9-208633 | 8/1997 |
| JP | 10-1564 | 1/1998 |
| KR | 94-19797 | 9/1994 |
| KR | 95-784 | 1/1995 |
| KR | 95-704405 | 11/1995 |
| KR | 96-1622 | 2/1996 |
| WO | WO 97/02296 | 7/1996 |
| WO | WO 98/28338 | 7/1998 |

OTHER PUBLICATIONS

Giles, J.R.M., et al., "Synthesis and characterization of ABA block copolymer-based polymer electrolytes," *Polymer*, vol. 28, pp. 1977–1981 (Oct. 1987).

* cited by examiner

*Primary Examiner*—Bernard Lipman
(74) *Attorney, Agent, or Firm*—Ladas & Parry

(57) ABSTRACT

The present invention relates to alkoxysilane-substituted diene copolymers, organic and inorganic hybrid complex compositions comprising the same and a process for the preparation of the same. The alkoxysilane-substituted diene copolymers are prepared by reacting a diene copolymer substituted by epoxy or hydroxy groups with a silane compound. Thus prepared alkoxysilane-substituted diene copolymer is characterized by the facts that it is in organic solvents and it is capable of being cured at low temperatures. The present invention also relates to a composition prepared by mixing the said copolymer with inorganic fillers and/or coupling agents. The copolymer of the formula (1) has high reactivity with coupling agents since it possesses reactive silane groups and thus provides the diene polymer composition as having improved compatibility with inorganic fillers. In addition, when the copolymer of the formula (1) is added to a sol-gel reactant, a substitution reaction proceeds smoothly even under mild reaction conditions and thus it is possible to introduce the third functional group to copolymer blocks.

9 Claims, No Drawings

DIENE COPOLYMER SUBSTITUTED BY ALKOXY SILANE, AND ORGANIC AND INORGANIC HYBRID COMPOSITION COMPRISING THE SAME

BACKGROUND OF THE INVENTION

1. Field of the Invention

The present invention relates to a diene copolymer substituted by silane groups, a composition comprising the same and a process for the preparation of the same. This diene copolymer is modified with silanes and has high solubility in organic solvents and high storage stability. The organic and inorganic hybrid composition comprising the said diene copolymer substituted by silane groups is useful in applications such as white or colored rubber compositions and conductive rubber compositions.

2. Background of the Invention

As chemical modification methods attempting to improve the physical properties of polymer materials including heat resistance, wear resistance, adhesive property and compatibility, copolymerization, block copolymerization or graft copolymerization which provide copolymers with different structural units and other techniques of introducing other functional groups have been developed.

Thus prepared polymers have high elasticity and mechanical properties and thus can be used in a wide range of applications such as tires, shoes, packings, hoses, sheets, impact absorbers, vibration absorbers or additives. However, said methods have restrictions in improving the mechanical properties of thermoplastic elastomers because they have low thermal stability and poor mechanical strength. In order to compensate such drawbacks associated with said chemical modification techniques, research in developing organic and inorganic hybrid materials by blending a polymer with an inorganic material such as silica or a glass fiber have been conducted hereto.

In this context, Korean Patent Laid-Open Publication No. 95-784 discloses the addition of polydimethylsiloxane to a styrene resin. Korean Patent Laid-Open Publication No. 94-19797 discloses the dispersion of polydimethylsiloxane in a styrene type resin composition, thereby remarkably improving wear resistance and impact resistance of the composition. Furthermore, Korean Patent Publication No. 96-1622 discloses a styrene type resin composition comprising (a) 100 parts by weight of styrene type polymer having no functional groups, (b) 0.01 to 30 parts by weight of styrene type polymer having epoxy groups and (c) 1 to 550 parts by weight of inorganic filler surface treated with silane compounds or titanium compounds. However, the organic polymer resin complex prepared by the dispersion of said polydimethylsiloxane or silane compounds has the problems in that firstly, phase seperation may occur due to the lack of covalent bonding between silane compounds and organic polymer resins and secondly, the affinity of silane compounds with inorganic fillers is poor due to the absence of polar groups or hydrophilic groups in silane compounds, thereby decreasing the compatibility of the complex.

Accordingly, in order to develop such organic and inorganic hybrid materials, the modification of polymers by reactive silane group is necessary to improve compatibility between those components. Korean Patent Laid-Open Publication No. 95-704405 discloses the example of the polymerization of hexamethylcyclotrisiloxane at the terminal of living anionic polymer. In this case, the phase isolation between polysiloxane and organic materials was some or less overcome, however since polydimethylsiloxane does not contain any polar groups or hydrophilic groups which would act as functional groups, the affinity with the inorganic fillers is low, thereby the compatibility thereof also decreases.

Therefore, the study of rubber complex wherein diene polymers are substituted by polar silane or silanol groups has become of popular interest. For instance, Takagishi et al. discloses the polymerization method of a vinyl derivative mixture such as butadiene or styrene by the use of Si-containing vinyl monomer such as γ-methacryloxypropyltripropoxysilane in Japanese Patent Laid-Open Publication No. 9-208632, Aug. 12, 1997. The European Patent Publication No. 786493 by Labauze and Gerard discloses that a composition comprising a diene polymer having terminal SiOH groups or OH group-terminated siloxane blocks and silane $ZR_1Si(OR_2)_3-n(R_3)_n$ wherein $R_{1-3}$ is alkyl, aryl or aralkyl group, Z is amine, polyamine or amine group and n is 0 to 2, has excellent hysteresis properties and S-vulcanizable properties and is suitable for the preparation of tires. However, diene polymers having terminal SiOH groups or alkoxy-terminated siloxanes are prone to gelation and lack storage stability and thus have problems to be industrialized.

Accordingly, there is a need for the development of a novel diene copolymer containing silane groups, which has an improved storage stability and is compatible with inorganic fillers such as silica and/or carbon black.

SUMMARY OF THE INVENTION

The present inventors have made extensive studies in order to overcome the aforementioned problems caused in the preparation of the diene copolymers and to develop a diene copolymer substituted by polar silane groups. As a result, the present inventors have now found that a diene copolymer substituted by silane groups can be prepared by either subjecting a diene copolymer block to epoxidation and reacting the resulting product with silane having amine groups or hydrating the epoxidated diene copolymer and then reacting the resulting product with reactive silanes.

The present inventors have also found that the composition prepared by adding silica, alkoxysilane or derivatives thereof and other additives to thus prepared diene copolymer is useful for the preparation of white or colored tires and may be applied as a conductive rubber complex if it is mixed with conductive carbons or carbon fibers. In particular, the present inventors have discovered that thus prepared composition may be applied onto a substrate or a mold, which is then heated at a temperature from room temperature to 170° C., resulting in film composite or a molded article filled with organic and inorganic hybrid composite or inorganic particles. The present invention is attained on the basis of these findings.

DETAILED DESCRIPTION

Accordingly, the present invention relates to alkoxysilane-substituted diene copolymer of the formula (1)

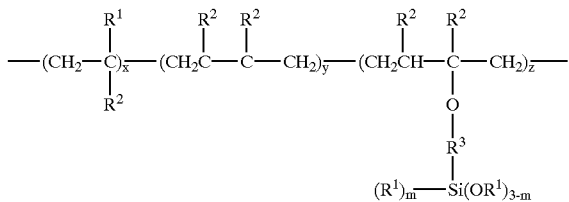

wherein

R¹ is H, a lower alkyl having carbon atoms less than 10, a fluoro group or unsubstituted or substituted benzene group, R² has the same meaning as R¹ or is ether and/or ester having carbon atoms less than 10, or alkyl group substituted by halogen, hydroxyl group, vinyl group and/or acrylic group, R³ is $W[(C(R^1)_2]_n$ wherein W is CO or CONHCO and n is a number from 0 to 10, x, y and z, each, independently of the other, are a number more than 0 and represent a weight ratio, and m is an integer from 0 to 3, provided that y block may comprise a partially hydrogenated $CH_2CH(R^2)CH(R^2)CH_2$.

The alkoxysilane-substituted diene copolymer of the formula (1) may be prepared by reacting a diene polymer of the formula (2)

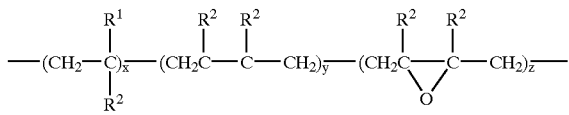

wherein R¹, R², x, y and z have the same meaning as defined in the formula (1), or the formula (3)

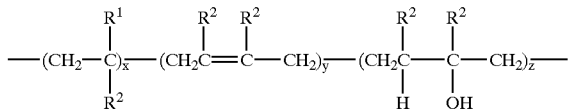

wherein R¹, R², x, y and z have the same meaning as defined in the formula (1), with a silane compound of the formula (4)

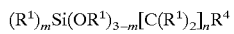

wherein R¹, m and n have the same meaning as defined in the formula (1) and R⁴ is halogen, hydroxyl group, vinyl group, acrylic group, COOH, NCO or $NH_2$.

The diene copolymer substituted by silane has good solubility in organic solvents and excellent adhesive property to a substrate and does not exhibit gelation after long time storage at room temperature due to its good storage stability.

The method for the preparation of the diene copolymer of formula (2) substituted by 1 to 70% of epoxy group is known and for example, can be obtained by reacting a diene copolymer with hydrogen peroxide or 3-chloroperoxy benzoic acid (refer to WO97/02296, WO98/28338, Japanese Patent Publication Hei 10-1564 and Polymer, 1987, 28, 1977).

The method for the preparation of the diene copolymer of formula (3) wherein the diene copolymer block is substituted by hydroxyl group is also known and for example, can be obtained by dissolving the copolymer of formula (2) in organic solvents and then reducing the resulting solution with metal hydride such as $LiAlH_4$ (refer to Polymer, 1987, 28, 1977).

The present invention also relates to a composition comprising said diene copolymer substituted by silane.

In particular, the present invention relates to a composition comprising (a) 1 to 95% by weight of alkoxysilane-substituted diene copolymer of the formula (1); and (b) 5 to 99% by weight of a mixture of one or two or more solvents or resins selected from the group consisting of alkylene glycol, chloroform, hexane, acetone, acetonitrile, lower alcohols and ketones having carbon atoms from 1 to 10, 1,2-dichloroethane, dimethylformamide, water, dimethylsulfoxide, sulfolane, toluene, xylene, 3-nitro-α, α, α-trifluorobenzene, α-methylnaphthaliene, methoxynaphthalene, chloronaphthalene, diphenylethane, quinoline, dichlorobenzene, dichlorotoluene, 1,2,3-trichloropropane, propylenecarbonate, diene polymer, polyvinyl alcohol, polymer of formula (2) or (3), polyolefine, polystyrene, polyvinyl butyral, polycarbonate, polyester, polyacrylate, polymethylmethacrylate and polyurethane.

Said composition may further comprise silica, conductive carbon and/or coupling agents. Typical examples of such additional components include one or two or more materials selected from the group consisting of acetylene black, short carbon fiber (SCF), carbon black, silica, tetraalkoxysilane, titanium alkoxide, glass fiber, $LiCoO_2$, $LiMn_2O_4$, Sulfur, $(R^1O)_mSi(R^2)_{3-m}$—$R^3$—$(R^1O)_mSi(R^2)_{3-m}$, $(RO)_kSi(R')_3$ wherein m is 0 to 3 and k is 0 to 3, conductive polymers (polyaniline, polypyrrole, polythiophen, polyacetylene etc), coupling agents $\{[Y(CH_2)_mX(CH_2X)_2[(CH_2)_mW]$ (hereinafter, $Y(CH_2)_mX(CH_2X)_2[(CH_2)_m$ is referred to as "Q"), $Q_2S_y$, $X(CH_2)_a(CH_2)_cW$ (hereinafter, $X(CH_2)_a(CH_2)_c$ W is referred to as "Q1"), $Q1_2S_y$, $QS_yQ1$ or $(RO)_3Si(CH_2)_aS_yR'_m$—Z$\}$), alkoxysilane modified reinforcing carbon black, thickening agents, curing agents, antioxidants, pigments, dyes and liquid electrolytes. In the above structures, R¹, R² and R³ are the same as in the formula (1), X is —OH, amino or carboxylic group, Y is —H or —OH, W is —OH, —SH, —CN, epoxy, allyl, vinyl, dithiocarbamate or benzothiazolyl group, m is 0 to 6, y is 1 to 6, a is 1 to 5, c is 0 to 3, R is methyl, ethyl, propyl or butyl group, R' is alkylene, Z is $SP(:X)(OR)_2$ and X is O or S.

The organic and inorganic hybrid composition according to the present invention is characterized by being curable at a low temperature. The present invention also relates to composite films, molded articles and polymer nano composite obtained by processing said composition at a temperature from room temperature to 170° C. in the presence or in the absence of vacuum. In particular, the molded articles prepared by filling with silica or carbon black into the composite maintain consistent tensile strength and elasticity after long period of use and thus can be used in the preparation of rubber compositions. The typical examples of such articles are white or colored tires or conductive rubber complexes. The polymer nano composite refers to the complex obtained by adding materials having a size of nanometer to the polymer and/or composition of the present invention.

In the following, the alkoxysilane-substituted diene copolymers, composition comprising the same and composite films and molded articles obtained therefrom will be explained in greater detail.

The alkoxysilane-substituted diene copolymer of the present invention may be prepared by dissolving a diene copolymer wherein 1 to 70% of diene copolymer blocks are substituted by epoxy or hydroxy groups in an organic solvent and then reacting the resulting solution with a compound of the formula (4). The reaction temperature is not particularly restricted, but preferably 30° C. to 100° C. and more preferably 50° C. to 80° C. The reaction time is from one hour to three days. For example, a styrene-butadiene copolymer substituted by triethoxysilane may be used for the preparation of the copolymer of the present invention. Said styrene-butadiene copolymer substituted by triethoxysilane may be prepared by dissolving styrene-butadiene in which 50% of hydroxy groups are substituted by triethoxysilane in tetrahydrofuran, adding a small portion of dibutyltin dilaurate as a catalyst to the solution, adding 0.5 ml (2 mmole) of 3-(triethoxysilyl)propyl isocyanate to the solution, refluxing the resulting mixture for 12 hours and then purifying the resulting product.

The polymer complex composition may be prepared by dissolving the diene copolymer of the formula (1) in an organic solvent and adding at least one polymer selected from the group consisting of reactive groups such as hydroxy group, amine group, epoxy group and halogen group to the resulting solution.

The processing of said compositions may lead to the preparation of modified diene copolymer complexes. To the said compositions inorganic fillers and conductive compounds may be further added, thereby forming functional complexes. For example, an elastomeric film may be obtained by applying a composition, obtained by dissolving 10 g of styrene-butadiene copolymer substituted by triethoxysilylpropylcarbamate in tetrahydrofuran, adding 2 g of styrene-butadiene copolymer substituted by hydroxy groups to the resulting solution and stirring the resulting mixture at room temperature, onto a glass substrate and then heating the applied composition at 50° C. under a reduced pressure for 12 hours.

In addition the said diene copolymer modified with alkoxysilane may be mixed with alkoxysilane derivatives such as $(R^1O)_nSi(R^2)_{3-n}$—$R^3$—$(R^1O)_nSi(R^2)_{3-n}$ and $(RO)_nSi(R')_3$ to form organic and inorganic hybrid compositions. Such hybrid compositions may be applied to or into substrates or molds and processed at from room temperature to 120° C. to give organic and inorganic rubber complexes in white color. For example, organic and inorganic complexes may be prepared by mixing styrene-butadiene copolymer substituted by triethyoxysilylpropylcarbamate with tetraethoxysilane, introducing the resulting mixture to a miller together with other additives and processing the resulting mixture at 70° C.

Furthermore, a thin film consisting of styrene-butadiene copolymer substituted by the siloxane group may be prepared by dissolving the said composition in 30 ml of tetrahydrofuran, applying the resulting solution onto a glass substrate and then drying the applied composition in a vacuum oven at 50° C. The said composition may, if desired, further comprise silica (size of particle: unit of nanomicron), sulfur or conductive polymers. Besides, the said composition may also further comprise one or two or more materials selected from the group consisting of coupling agents {[Y $(CH_2)_mX(CH_2X)_2[(CH_2)_mW]$ (hereinafter, $Y(CH_2)_mX(CH_2X)_2[(CH_2)_m$ is referred to as "Q"), $Q_2S_y$, $X(CH_2)_a(CH_2)_cW$ (hereinafter, $X(CH_2)_a(CH_2)_cW$ is referred to as "Q1"), $Q1_2S_y$, $_{QSy}Q1$ or $(RO)_3Si(CH_2)_aS_yR'_m$—Z}, other thickening agents, curing agents and antioxidants, which are reagents used under conventional vulcanizing conditions.

Specifically, the conductive rubber complex composition comprises (a) 5 to 95 parts by weight of the diene copolymer of the formula (1), (b) 5 to 30 parts by weight of at least one conductive particle selected from the group consisting of short carbon fiber, acetylene black, furnace carbon black and conductive polymer and (c) 0 to 95 parts by weight of at least one resin selected from the group consisting of polymer of the formula (2), polymer of the formula (3), diene copolymer and silicon rubber. The said composition may be processed in a similar manner as the above-mentioned process method to form conductive components or thin films. For example, a conductive rubber film having an electric conductivity more than $9 \times 10^{-1}$ S/cm may be prepared by applying a composition obtained by mixing 100 g of styrene-butadiene copolymer substituted by siloxane group with 30 g of acetylene black onto a substrate and drying the applied composition. The said conductive rubber composition may further comprise one or two or more materials selected from the group consisting of $LiCoO_2$, $LiMn_2O_4$, DMCT(2,5-Dimercapto-1,3,4thiadiazole, dipotassium salt) conductive polymer (polyaniline, polypyrrole, polythiophen, polyacetylene), $(R^1O)_nSi(R^2)_{3-n}$—$R^3$—$(R^1O)_nSi(R^2)_{3-n}$ and/or $(RO)_nSi(R')_{4-n}$ alkoxysilane modified reinforcing carbon black, solvents, thickening agents, curing agents and antioxidants, which are reagents used under conventional vulcanizing conditions.

The copolymer of the formula (1) has high reactivity with coupling agents since it possesses reactive silane groups and thus provides a diene polymer composition having improved compatibility with inorganic fillers. In addition, when the copolymer of the formula (1) is added to a sol-gel reactant, a substitution reaction proceeds smoothly even under mildly reacting conditions and thus it is possible to introduce the third functional group to copolymer blocks consisting of repeated units of regular monomers. For instance, an ionic conductive composition may be prepared by dissolving both polyoxyethylene substituted trialkoxysilane, $(EtO)_3SiCH_2CH_2CH_2NHCO$—O—$(CH_2CH_2O)_nCH_3$ and stryene-butadiene copolymer substituted by the said triethoxysilylpropylcarbamate in tetrahydrofuran, adding both aqueous hydrochloric acid solution and lithium trifluorosulfonate to the resulting solution, stirring the resulting solution at room temperature for 12 hours and then subjecting the resulting solution to condensation under a reduced pressure. Thus the prepared composition may be applied onto a glass substrate, dried in an oven at 70° C. to obtain an ionic conductive film having an ionic conductivity of $10^{-6}$ S/cm at room temperature. In order to improve the effects of ionic conduction or mechanical properties, the said ionic conductive composition may further comprise one or two or more compounds selected from the group consisting of low molecular weight (200 to 1000) polyethylene glycol or its derivatives, $(R^1O)_nSi(R^2)_{3-n}$—$R^3$—$(R^1O)_nSi(R^2)_{3-n}$, $(RO)_n Si(R')_{4-n}$ and liquid electrolyte.

The said alkoxysilanemodified diene copolymer is capable of forming a complex in the: manner of the polar interaction, exhibiting good compatibility with silica and inorganic fillers.

In particular, the alkoxysilane modified diene copolymer according to the present invention is highly soluble in general organic solvents such as xylene, tetrahydrofuran, acetonitrile, sulfolane, propylene carbonate or acetone and thus it is possible to prepare an elastomer substituted by silica which can be prepared from the composition comprising of the said alkoxysilane modified diene copolymer according to the present invention. The said composition may be used in many applications such as conductive rubber, tires, gum, adhesives, sealants, coating compositions, electrolytic film, batteries, chip size package semiconductor devices or transistors.

EXAMPLE

The present invention is described in more detail by referring to the following examples without limiting the scope of the invention in any way.

3-chloroperoxybenzoic acid, LiAlH$_4$, dibutyltin dilauate and (triethoxysilyl)propyl isocyanate used in the examples were purchased from Aldrich Co. The conductivity was calculated by determining the voltage drop of pellets in four probe types according to the current change in a conductivity-detecting device. The conductivity-detecting device adopted 181 NANOVOLTMETER and 220 PROGRAMMABLE CURRENT SOURCE manufactured by KEITHLEY Co.

Example 1

Preparation of Styrene-butadiene Copolymer Substituted by Epoxy Groups

To a 1000 ml three-necked round bottom flask 10 g of styrene-butadiene copolymer (content of styrene 31% by weight) was introduced. To this 150 ml of methylene chloride was added to dissolve the copolymer. The resulting solution was mixed with a solution obtained by dissolving 16 g (92 mmol) of 3-chloroperoxybenzoic acid in 160 ml of methylene chloride and then stirred for 5 hours under reflux. After stirring at room temperature for 16 hours, the reaction mixture were filtered. To the reaction mixture a large amount of methanol was added to give precipitates, which were then filtered, washed and dried to obtain styrene-butadiene copolymer substituted by epoxy groups in the form of a solid precipitate (Yield: 85%). The elementary analysis showed that the content of oxygen element was 11.23% and the weight ratio of butadiene substituted by epoxy groups was 49%.

Elementary analysis: % C: % H: % O=74.72:14.05:11.23

$^1$H-NMR (CDCl$_3$): 1.5–2.1 ppm (CH—CH$_2$, CH$_2$), 2.6–2.9 ppm (CHOCH), 5.4 ppm (CHCH), 6.5–7.2 ppm (C$_6$H$_5$), IR: 1255 cm$^{-1}$ (CHOH)

Example 2 and 3

Epoxydiene copolymers were prepared in the same manner as in Example 1 except that the diene polymer and the content of 3chloroperoxybenzoic acid were changed as follows:

| Examples | Diene polymer (g) | 3-chloroperoxybenzoic acid | % [O] |
|---|---|---|---|
| Ex. 2 | 32 | 16 | 5.8 |
| Ex. 3 | 32 | 6 | 2.0 |

Example 4

Preparation of Styrene-butadiene Copolymer Substituted by Hydroxy Groups

To a 1000 ml three-necked round bottom flask 5 g of styrene-butadiene copolymer substituted by epoxy groups is added and to this 400 ml of tetrahydrofuran was added to dissolve the copolymer. To the resulting solution 0.6 g (0.015 mol) of LiAlH$_4$ was added and then refluxed for 3 hours. After the completion of the reaction, hydrochloric acid and water were added to degrade unreacted LiAlH$_4$. The resulting solution was extracted with methylene chloride and washed with water. After condensation of the solution, a large amount of methanol was added to the condensed solution to give a precipitate, which was filtered and washed to give a stryene-butadiene copolymer substituted by hydroxy groups in the form of a solid (Yield: 4g).

$^1$H-NMR (CDCl$_3$): 1.5–2.1 ppm (CH—CH$_2$, CH$_2$), 3.7 ppm (CH—OH), 5.4 ppm (CHCH), 6.5–7.2 ppm (C$_6$H$_5$), IR: 3394 cm$^{-1}$ (—OH)

Example 5

Preparation of Styrene-butadiene Copolymer Substituted by Triethoxysilylpropylamine Groups To a 250 ml three-necked round bottom flask 2 g (6 mmol) of styrene-butadiene copolymer substituted by epoxy groups was added and to this 80 ml of tetrahydrofuran was added to dissolve the copolymer. To the resulting solution a small amount of dibutyltin dilaurate was added as a catalyst and 0.5 ml (2 mmol) of 3-(triethoxysilyl)propylamine was added and then refluxed for 12 hours. After cooling the reactant to room temperature, the reactants were condensed and,.then to the condensed mixture a large amount of hexane was added to give a white precipitate. The precipitate was filtered, washed and dried to give a styrene-butadiene copolymer substituted by triethoxysilylrpopyl carbamate in a yield of 80%.

IR: 3350–3400 cm$^{-1}$ (—NH—), 2800–2980 cm$^{-1}$ (CH), 1260 cm$^{-1}$ (Si—CH)

Example 6

Preparation of Styrene-butadiene Copolymer Substituted by Triethoxysilylpropylcarbamate Groups To a 250 mnl three-necked round bottom flask 2 g (6 mmol) of styrene-butadiene copolymer substituted by hydroxy groups was added and to this 80 ml of tetrahydrofuran was added to dissolve the copolymer. To the resulting solution a small amount of dibutyltin dilaurate as a catalyst was added and 0.5 ml (2 mmol) of 3-(triethoxysilyl)propyl isocyanate was added and then refluxed for 12 hours. After cooling the reactants to room temperature, the reactants were concentrated and then to the concentrated mixture a large amount of hexane was added to give a white precipitate. The precipitate was filtered, washed and dried to give a styrene-butadiene copolymer substituted by triethoxysilylrpopyl carbamate in a yield of 90%.

IR: 3350–3400 cm$^{-1}$ (—NH—), 2800–2980 cm$^{-1}$ (CH), 1736 cm$^{-1}$ (C=O), 1260 cm$^{-1}$ (Si—CH)

The prepared polymer didn't show gelation even after storage at room temperature for more than six months.

Example 7

Preparation of Polymer/polymer Composite Composition and Complex thin Film 10 g of styrene-butadiene copolymer substituted by triethoxysilylpropylcarbamate obtained in Example 6 was dissolved in tetrahydrofuran and to this 2 g of styrene-butadiene copolymer substituted by hydroxy groups obtained in Example 4 was added and then the resulting solution was stirred at room temperature. After filtering out the insoluble solid, the solution was applied onto a glass substrate and then to this heat was applied at 50° C. for 12 hours to obtain a thin film having elasticity.

Tensile strength: 21.9 Mpa

Example 8

Preparation of Conductive Rubber Composition 10 g of styrene-butadiene copolymer substituted by triethoxysilylpropylcarbamate obtained in Example 6 was dissolved in acetonitrile and to this 3 g of acetylene black was added and then the resulting solution was stirred at room temperature. After filtering out the insoluble solid, the solution was condensed by distillation under a reduced pressure to give a composition exhibiting high viscosity when 20% of the weight was reduced. The prepared composition was casted onto a glass substrate, heated at 50° C. for 12 hours under a reduced pressure to obtain a thin film having an electric conductivity of 0.832 S/cm at room temperature.

Examples 9 to 18

Other conductive thin films were prepared by changing the amount of components of the composition and reaction conditions as follows:

pare a composition having high cosity when 20% of the weight was reduced. The prepared composition was then casted onto a glass substrate, heated at 110° C. for 22 hours under a reduced pressure to obtain a styrene-butadiene copolymer filled with silica in a size of several tens of nano micrometer.

Example 20

Preparation of Silica Complex of Diene Copolymer; Preparation of White Rubber Composition 50 g of diene polymer prepared in Example 4, 50 g of polymer prepared in Example 6, 30 g of silica, 8 g of SI 69 (silane coupler), 1.8 g of sulfur, 5 g of aromatic oil, 2.5 g of ZnO, 1.5 g of stearic acid, 1.9 g of antioxidant, 1.5 g of paraffin wax and 1.4 g of sulfenamide were mixed together and the resulting mixture was subjected to cross linking by the use of a twin-miller at 150° C. for 15 minutes to obtain an organic and inorganic hybrid rubber sample. The tensile strength of the thus prepared rubber sample was 22.1 Mpa at room temperature, which did not change much after leaving it for 3 months.

| | Diene Copolymer | | Additive | | AB | | Vacuum Temp/Time | Conductivity |
|---|---|---|---|---|---|---|---|---|
| Ex. | Structure | g | Structure | g | g | Solvent | ° C./hr | S/cm |
| 9 | SBR | 100 | — | — | 20 | THF | 80/16 | Less than 0.0001 Do not form thin film |
| 10 | Ex. 1 | 100 | — | — | 20 | THF | 80/12 | Less than 0.0001 |
| 11 | Ex. 5 | 100 | — | — | 20 | THF | 80/12 | 0.08 |
| 12 | Ex. 6 | 100 | — | — | 10 | THF | 70/12 | 0.14 |
| 13 | Ex. 6 | 100 | $(CH_3CH_2O)_3Si(CH_2)_3$—S—$S(CH_2)_3Si(OCH_2CH_3)_3$ | 30 | 30 | THF | 90/12 | 0.8 |
| 14 | Ex. 6 | 100 | $(CH_3CH_2O)_3Si(CH_2)_3$—NHCO$(CH_2CH_2)_{7-8}OCONH(CH_2)_3$$Si(OCH_2CH_3)_3$ | 30 | 10 | THF + AN | 80/15 | 0.09 |
| 15 | Ex. 6 | 100 | $(CH_3CH_2O)_3Si(CH_2)_3$—S—$S(CH_2)_3Si(OCH_2CH_3)_3$ | 30 | 10 | THF + DMF | 80/15 | 0.05 |
| 16 | Ex. 6 | 100 | Example 4 | 100 | 60 | THF + DMF | 80/15 | 0.91 |
| 17 | Ex. 6 | 100 | Example 4 $(CH_3CH_2O)_3Si(CH_2)_3$—S—$S(CH_2)_3Si(OCH_2CH_3)_3$ | 100 60 | 60 | THF | 80/15 | 0.92 |
| 18 | Ex. 6 | 100 | Example 1 $(CH_3CH_2O)_3Si(CH_2)_3$—S—$S(CH_2)_3Si(OCH_2CH_3)_3$ | 100 60 | 60 | THF | 80/18 | 0.06 |

In the Table:
Ex.: Example
Temp: Temperature
SBR: Styrene-butadiene Rubber (random copolymer)
AB: Acetylene black
AN: Acetonitrile
DMF: Dimethylformamide
THF: Tetrahydrofuran

Example 19

Preparation of Silica Complex of the Diene Copolymer 60 g of styrene-butadiene copolymer substituted by triethoxysilylpropyl carbamate obtained in Example 6 was mixed with 42 g of tetraethoxysilane, 1 10 g of ethylalcohol and 180 g of dimethylformamide and stirred for 12 hours. To the resulting solution 40 g of aqueous HCl solution (0.15N) was added and then the solution was stirred at room temperature for one day. The reaction temperature was:raised to 50° C. and then stirred for 12 hours. The reactants were condensed by distillation under a reduced pressure to pre-

EFFECTS OF THE INVENTION

The alkoxysilane-substituted diene copolymers according to the present invention are characterized by the facts that they are highly soluble in organic solvents and are capable of being cured at low temperature. In addition, the composition prepared by mixing the said copolymers with inorganic fillers and/or coupling agents have high reactivity with coupling agents and compatibility with inorganic fillers since the diene copolymers substituted by silanes contain reactive silane groups. For this reason, the composition may be used in applications such as white or colored rubber complex and conductive rubber complex. Furthermore, if the copolymer of the present invention is added to a gel-sol reactant, it proceeds substitution reaction smoothly even under mildly reacting conditions and thus it is possible to introduce the third functional group to copolymer blocks consisting of repeated units of regular monomers. It is also possible to prepare a polymer nano composite or a hybrid polymer wherein organic or inorganic fillers are incorporated from the said composition.

What is claimed is:

1. An alkoxysilane-substituted diene copolymer of formula (1)

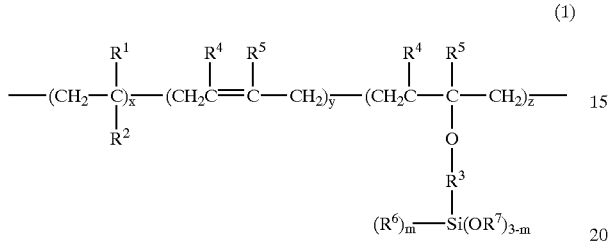
(1)

wherein
- $R^1$, $R^6$, and $R^7$ are the same or different from each other, and are each independently H, a lower alkyl having 10 or fewer carbon atoms, a fluoro group, or an unsubstituted or substituted benzene group,
- $R^2$, $R^4$, and $R^5$ are the same or different from each other, and are each independently H, a lower alkyl group having 10 or fewer carbon atoms, a fluoro group, an unsubstituted or substituted benzene group, or an ether and/or an ester having 10 or fewer carbon atoms, wherein the lower alkyl group is optionally substituted with a halogen, a hydroxyl group, a vinyl group and/or an acrylic group,
- $R^3$ is $W[(C(R^1)_2]_n$, wherein W is CO, CONHCO, or NHCO and n is an integer from 0 to 10,
- x, y, and z are each, independently of each other, a number more than 0 and represent a weight ratio, and m is an integer from 0 to 3.

2. A process for preparing the alkoxysilane-substituted diene copolymer of the formula (1) as claimed in claim 1, which comprises reacting a diene polymer of formula (2)

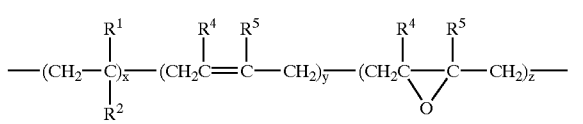
(2)

or a diene polymer of formula (3)

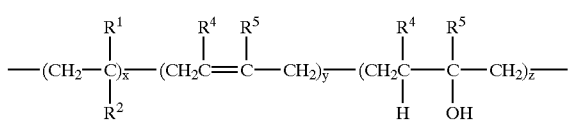
(3)

with a silane compound of formula (4)

(4)

wherein $R^1$, $R^2$, $R^3$, $R^4$, $R^5$, $R^6$, $R^7$, x, y, z, m, and n are defined in claim 1 and wherein $R^8$ is a halogen, a hydroxyl group, a vinyl group, an acrylic group, COOH, NCO, or $NH_2$.

3. A composition comprising:
(a) 1 to 95% by weight of the alkoxysilane-substituted diene copolymer of the formula (1) as claimed in claim 1; and
(b) 5 to 99% by weight of a mixture of one or two or more solvents or resins selected from the group consisting of alkyleneglycol, chloroform, hexane, acetone, acetonitrile, lower alcohols and ketones having carbon atoms from 1 to 10, 1,2-dichloroethane, dimethylformamide, water, dimethylsulfoxide, sulfolane, toluene, xylene, 3-nitro-α, α, α-trifluorobenzene, α-methylnaphthalene, methoxynaphthalene, chloronaphthalene, diphenylethane, quinoline, dichlorobenzene, dichlorotoluene, 1,2,3-trichloropropane, propylenecarbone, diene polymer, polyvinylalcohol, polyolefine, polystyrene, polyvinyl butyral, polycarbonate, polyester, polyacrylate, polymethylmethacrylate, polyurethane, a diene polymer r of formula (2)

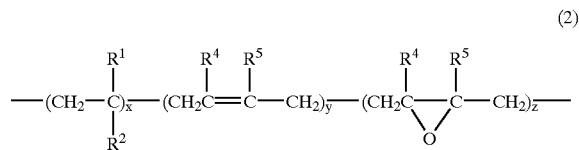
(2)

and a diene polymer of formula (3)

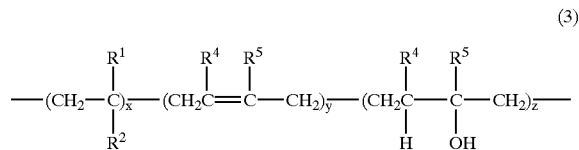
(3)

wherein $R^1$, $R^2$, $R^3$, $R^4$, $R^5$, x, y, and z are defined in claim 1.

4. A composition as claimed in claim 3, wherein the composition may further comprise one or two or more materials selected from the group consisting of acetylene black, short carbon fiber, carbon black, silica, teteraalkoxysilane, titanium alkoxide, glass fiber, $LiCoO_2$, $LiMn_2O_4$, sulfur, $(R^1O)_pSi(R^2)_{3-p}$—$R^3$—$(R^1O)_pSi(R^2)_{3-p}$, $(RO)_kSi(R')_{4-k}$ wherein p is an integer from 0 to 3 and k is an integer from 0 to 4, conductive polymers, coupling agent, alkoxysilane modified reinforcing carbon black, thickening agents, curing agents, antioxidants, pigments, dyes, and liquid electrolytes;

wherein the coupling agent may be QM, $Q_2S_f$, Q1, $Q1_2S_f$, $QS_fQ1$, or $(RO)_3Si(CH_2)_aS_fR'_d$—Z, wherein Q is $Y(CH_2)_dX(CH_2X)_2[(CH_2)]_d$, and wherein Q1 is $X(CH_2)_a(CH_2)_cM$;

wherein the conductive polymers are selected from the group consisting of polyaniline, polypyrrole, polythiophen, polyacetylene, and other conductive polymers;

wherein $R^1$, $R^2$, and $R^3$ are defined in claim 3; wherein X is —OH, an amino, or a carboxylic group, Y is —H or —OH, M is —OH, —SH, —CN, epoxy, allyl, vinyl, dithiocarbamate, or a benzothiazolyl group, d is an integer from 0 to 6, f is an integer from 1 to 6, a is an integer from 1 to 5, c is an integer from 0 to 3, R is a methyl, ethyl, propyl or butyl group, R' is alkylene, Z is $SP(:R^9)(OR)_2$ and $R^9$ is O or S.

5. A composite film, molded article, or polymer nano composite obtained by processing the copolymer as claimed in claim 1 at a temperature from room temperature to 170° C. in the presence of or in the absence of a vacuum.

6. A composite film, molded article, or polymer nano composite obtained by processing the copolymer that is prepared by the process claimed in claim 2.

7. A composite film, molded article, or polymer nano composite obtained by processing the composition claimed in claim 3.

8. A composite film, molded article, or polymer nano composite obtained by processing the composition claimed in claim 3.

9. A composite film, molded article, or polymer nano composite obtained by processing the copolymer as claimed in claim 1 at a temperature up to 170° C. and optionally in a vacuum.

* * * * *